United States Patent
Ueno

(10) Patent No.: US 10,576,571 B2
(45) Date of Patent: Mar. 3, 2020

(54) PROCESSING APPARATUS

(71) Applicant: MUNEKATA INDUSTRIAL MACHINERY Co., Ltd., Fukushima (JP)

(72) Inventor: Akira Ueno, Fukushima (JP)

(73) Assignee: MUNEKATA INDUSTRIAL MACHINERY Co., Ltd., Fukushima (JP)

( * ) Notice: Subject to any disclaimer, the term of this patent is extended or adjusted under 35 U.S.C. 154(b) by 48 days.

(21) Appl. No.: 15/826,034

(22) Filed: Nov. 29, 2017

(65) Prior Publication Data

US 2018/0147648 A1  May 31, 2018

(30) Foreign Application Priority Data

Nov. 30, 2016 (JP) ................. 2016-232860

(51) Int. Cl.
| | |
|---|---|
| *B23K 9/095* | (2006.01) |
| *B23K 9/10* | (2006.01) |
| *G05B 19/05* | (2006.01) |
| *B23K 31/02* | (2006.01) |
| *B23K 20/00* | (2006.01) |
| *B23K 37/02* | (2006.01) |
| *B23K 37/04* | (2006.01) |

(52) U.S. Cl.
CPC .......... *B23K 9/0953* (2013.01); *B23K 9/1087* (2013.01); *B23K 20/00* (2013.01); *B23K 31/02* (2013.01); *B23K 37/02* (2013.01); *B23K 37/0408* (2013.01); *G05B 19/05* (2013.01); *G05B 19/056* (2013.01); *G05B 2219/2231* (2013.01); *G05B 2219/50132* (2013.01)

(58) Field of Classification Search
CPC .... B23K 9/0953; B23K 9/1087; B23K 20/00; B23K 31/02; B23K 37/02; B23K 37/0408; G05B 19/05; G05B 19/056
See application file for complete search history.

(56) References Cited

U.S. PATENT DOCUMENTS

2015/0144601 A1* 5/2015 Yeum ................ B23K 37/0443
219/86.24

FOREIGN PATENT DOCUMENTS

JP  2015-231648 A  12/2015

* cited by examiner

*Primary Examiner* — Mark A Connolly
(74) *Attorney, Agent, or Firm* — McGlew and Tuttle, P.C.

(57) ABSTRACT

Provided is a processing apparatus where the exchange of an operating program for an apparatus body is not required each time a jig unit is exchanged. The processing apparatus includes an apparatus body and a jig unit. A master control device is mounted on the jig unit. Operations of the jig unit and the apparatus body are controlled by an operating program in the master control device.

12 Claims, 5 Drawing Sheets

PROCESSING APPARATUS

CROSS REFERENCE TO RELATED APPLICATIONS

This application claims the benefit of priority under 35 U.S.C. § 119 of Japan Application 2016-232860, filed Nov. 30, 2016, the entire contents of which are incorporated herein by reference.

BACKGROUND OF THE INVENTION

Field of the Invention

The present invention relates to a processing apparatus formed of a processing apparatus body and a jig unit which can be used in an exchangeable manner with respect to the processing apparatus body.

Description of the Related Art

As a processing apparatus, a processing apparatus is used where a jig unit is exchanged with respect to a processing apparatus body thus performing various kinds of processing.

In the case of such a processing apparatus, when the jig unit is exchanged, different operating programs are required for respective jigs. Accordingly, it is necessary to change over the operating program stored in a control device on the processing apparatus body each time the jig unit is exchanged.

Assume a case where a jig unit is newly introduced. In such a case, each time the jig unit is newly introduced, it is necessary for the control device on the processing apparatus body to install and adjust an operating program after the jig unit is introduced.

Such a technique requires complicated management of processing programs which correspond to various jig units (jig devices). In view of the above, Japanese Patent Laid-Open No. 2015-231648 discloses a processing apparatus where an operating program is individually stored in each jig unit thus shortening the introduction time.

SUMMARY OF THE INVENTION

However, in Japanese Patent Laid-Open No. 2015-231648, each jig unit includes an individual control device and operating program. Accordingly, an operation control performed by the operating program is limited to the corresponding jig unit.

In an actual operation, it is necessary to attach the jig unit to the processing apparatus body, and to perform operation controls of the processing apparatus body and the jig unit simultaneously.

In Japanese Patent Laid-Open No. 2015-231648, however, each time the jig unit is exchanged, it is necessary to perform a procedure to confirm that the control device on the processing apparatus body matches the operating program for the jig unit. Accordingly, both the processing apparatus body and the jig unit are required to have identification information so as to perform matching confirmation.

It is an object of the present invention to provide a processing apparatus having the following technical feature. That is, different from a conventional technique where a control device and operating programs are mounted on a processing apparatus body, a control device storing all operating programs for a jig unit and a processing apparatus body is mounted on the jig unit so that the control device has operation functions for both the jig unit and the processing apparatus body. Accordingly, the processing apparatus body is merely operated as a basic machine.

With such a configuration, in exchanging the jig unit with a variety of jig units with respect to the processing apparatus body, it becomes unnecessary to perform matching confirmation so as to confirm whether or not the operating program for the processing apparatus body matches the operating program for the jig unit. Accordingly, it is possible to shorten a start-up time and, at the same time, the operating program for the processing apparatus body can be managed by the single jig unit.

To achieve the above-mentioned object, the invention is directed to a processing apparatus which includes: an apparatus body; and a jig unit, wherein a master control device is mounted on the jig unit, and operations of the jig unit and the apparatus body are controlled by an operating program in the master control device.

According to a further aspect of the invention, a slave control device is mounted on the apparatus body, the master control device and the slave control device include a communication device (communication function) respectively, and an operation control performed by the operating program in the master control device controls an operation of the apparatus body through the slave control device.

According to a further aspect of the invention the master control device is mounted on one jig unit which is an upper jig or a lower jig, a second slave control device including a communication device is mounted on another jig unit which is the other of the upper jig and the lower jig, and the jig unit on which the second slave control device is mounted is controlled by the operating program in the master control device through the second slave control device.

According to a further aspect of the invention with the processing apparatus, the master control device, the slave control device, and the second slave control device are programmable logic controllers (PLCs).

According to a further aspect of the invention, the processing apparatus is a heat welding device, and the jig unit includes a heat welding unit where an operation of the heat welding unit is controlled by the master control device.

According to a further aspect of the invention, in the processing apparatus described, in a state where the jig unit is removed from the processing apparatus, an operation of the apparatus body is controlled by the slave control device.

According to the invention, a control of the processing apparatus body is performed by the operating program stored in the master control device of the jig unit. Therefore, in exchanging the jig unit, it becomes unnecessary to change over the operating program for the processing apparatus body.

In a processing apparatus having a conventional configuration, when a jig unit is exchanged, it is necessary to change over an operating program stored in a PLC on an apparatus body with certainty. According to an aspect of the invention, however, there is no possibility that a problem occurs in an operating program due to a conflict between the operating program and the jig unit.

Further, when a processing target product is changed so that the jig unit is required to have an additional function such as a new operation or the number of processing points, by changing the operating program in the master control device, a function can be freely added to the jig unit.

Further, According to an aspect of the invention, the slave control device including the communication device is mounted on the apparatus body. Accordingly, a communication control of equipment of the apparatus body, such as a cylinder, can be performed by an operation command from the master control device through the slave control device.

Therefore, a control connection between the apparatus body and the jig unit can be simplified.

In performing the communication control, the slave control device functions as a communication terminal of the master control device. Accordingly, an operator is not required to pay attention to the presence of the slave control device.

Further, the slave control device incorporates an operation correction (correction of a stroke amount and operation speed) required due to individual differences in the electric cylinder so that the electric cylinder can be operated under a fixed correction condition with respect to a command program. Accordingly, even when the jig unit is attached to another apparatus body, processing irregularities caused by individual differences in the electric cylinder can be eliminated and hence, processing can be performed in a stable manner.

The communication between the master control device and the slave control device can be performed through a dedicated communication cable with a communications protocol such as RS-232C, RS485, CC-Link (registered trademark of Mitsubishi Electric Corporation) or Ethernet (registered trademark of Fuji Xerox Co., Ltd.). Accordingly, an operation control can be performed by merely connecting one communication cable.

Accordingly, when an addition or a change of an electric cylinder, a power source device or the like is made with respect to the apparatus body, it is unnecessary to add or modify a communication line between the master control device of the jig unit and the apparatus body. For this reason, the processing apparatus possesses excellent expandability.

According to an aspect of the invention, as an addition of a function to the upper and lower jig units, the second slave control device is mounted on the jig unit. With such a configuration, complicated operation control of the upper and lower jig units can be performed respectively in an independent manner or in an interlocking manner.

As equipment which can be controlled in a state of being connected to the master control device or the second slave control device mounted on the jig unit, a code reader, a camera, a thermometer, a presence sensor, a measurement sensor, a load cell, a robot, a motor, an air/electric cylinder, a temperature controller, a power regulator, a laser marker, a welding machine, a parts feeder or the like may be used. However, the equipment is not limited to the above-mentioned equipment, and a wide range of measurements or operations can be performed.

According to another aspect of the invention, a general programmable logic controller (PLC) which is commercially available is used as the control device. Accordingly, creation or debugging of an operating program is facilitated so that equipment installation costs can be lowered.

According to an aspect of the invention described, it is provided that a processing apparatus includes a power source device for welding, the jig unit can be easily exchanged and hence, the time required for changing over a model can be shortened. Therefore, it is possible to provide a welding device which can handle an addition or change of a welding function.

According to another aspect of the invention, even in a state where the jig unit is removed from the processing apparatus, a manipulation of the apparatus body can be performed so that a jig can be easily exchanged.

DETAILED DESCRIPTION OF THE PREFERRED EMBODIMENT

Figure 1:
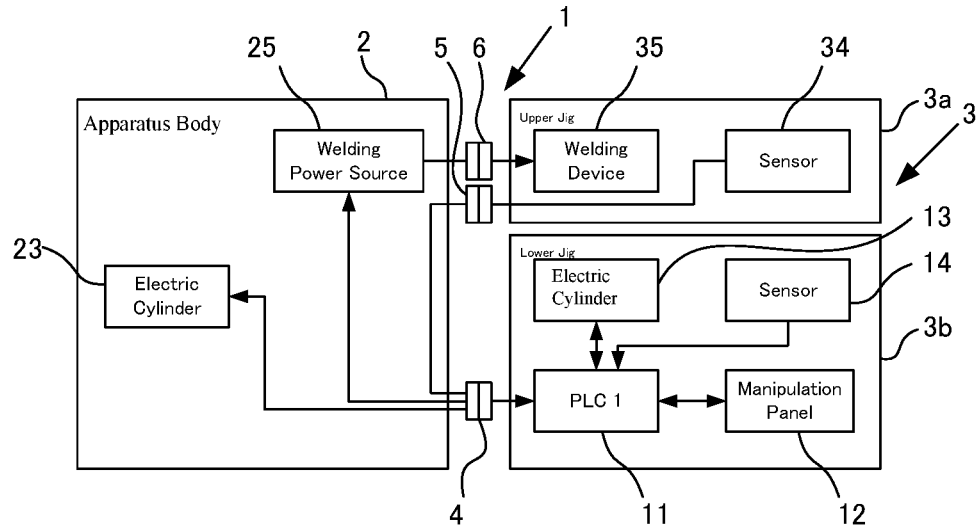
FIG. 1 is a diagram showing a schematic configuration where a welding device is mounted on a processing apparatus according to the invention.

FIG. 1 is a diagram showing a schematic configuration where a welding device is mounted on a processing apparatus according to an embodiment of the present invention.

In the embodiment of the present invention, a programmable logic controller (PLC) is used as a control device so that the control device is referred to as "PLC" hereinafter.

As shown in FIG. 1, the processing apparatus 1 of this embodiment is formed of an apparatus body 2, and a jig unit 3 which is exchangeable with respect to the apparatus body 2. The jig unit 3 is formed of: an upper jig 3a on which the welding device 35 and a sensor 34 are mounted; and a lower jig 3b on which a master PLC 11, a manipulation panel 12, an electric cylinder 13, and a sensor 14 are mounted.

The apparatus body 2 is formed of an electric cylinder 23 and a welding power source 25. A welding power is supplied to the welding device 35 of the upper jig 3a from the welding power source 25 through a welding power source connector 6.

The sensor 34 of the upper jig 3a is a thermocouple of welding tips 36 of the welding device and a stroke sensor for the welding tips. Signals from the sensor are transmitted to the master PLC 11 via a communication connector 4 and a communication connector 5.

An air supply coupler not shown in the drawing is disposed in combination with the communication connector 4 and the communication connector 5 respectively.

Accordingly, air is supplied to the upper jig 3a and the lower jig 3b from the apparatus body 2 so as to cool an air driven clamping device not shown in the drawing and the welding tips 36.

Plural kinds of jig units 3 are prepared corresponding to a product to be subjected to welding processing. Provided that devices to be mount on the jig unit 3 have the same functional configuration (a welding method and a required electrical energy), it is possible to freely change the number of welding points of the jig unit 3, the operation of the electric cylinder, a function of a sensor and the number of sensors to be used.

The master PLC 11 performs, by an operating program stored in the master PLC 11, an operation control of the electric cylinder 13 of the jig unit 3 and, at the same time, an operation control of the electric cylinder 23 and the welding power source 25 of the apparatus body 2.

In the processing apparatus 1 having the above-mentioned configuration, the operation control of the apparatus body 2 and the jig unit 3 is performed by the operating program in the master PLC 11 of the jig unit 3 so as to perform welding processing of a product.

After an operator attaches the jig unit 3 to the apparatus body 2, all processing is performed by the control program in the master PLC 11. Accordingly, even when the jig unit 3 is attached to another apparatus body 2, it is unnecessary to perform an operation for exchanging a program and matching confirmation between a product and a program.

Accordingly, even when a model of the apparatus is frequency changed according to production schedule requirements, by merely exchanging the jig unit 3, it is possible to start welding processing immediately without performing matching confirmation of the program.

Figure 2:
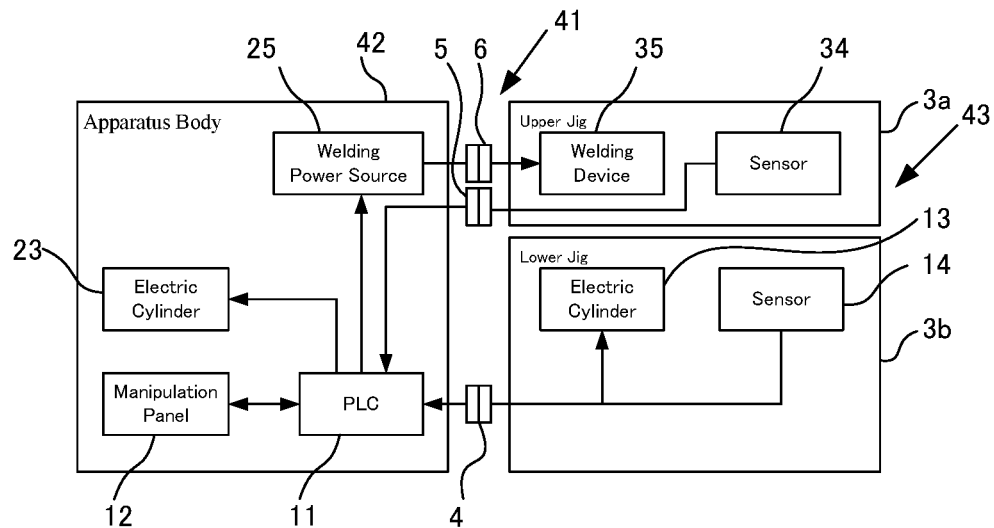
FIG. 2 is a diagram showing a schematic configuration of a conventional processing apparatus.

In the case of a conventional welding device 41 shown in FIG. 2, after a jig unit 43 is exchanged with respect to an apparatus body 42, it is necessary to change over an operating program in a master PLC 11 to an operating program which corresponds to the jig unit 43, and to confirm that the operating program definitely corresponds to the jig unit 43.

The operating program depends on the control function of the master PLC 11. Accordingly, in renewing the jig unit 43 due to the changing over of the model of product to be processed, when the jig unit 43 is required to have a new function, there is a possibility that a function cannot be added depending on the control function of the master PLC 11. In such a case, it is necessary to exchange the master PLC 11.

However, when the master PLC 11 is exchanged with a new master PLC, there is a concern of the new master PLC becoming incompatible with the jig unit 43 which is conventionally used. In such a case, there is a problem in that the advantage is lost which is gained by adopting a method where the jig unit is exchanged for the processing apparatus.

Figure 3:
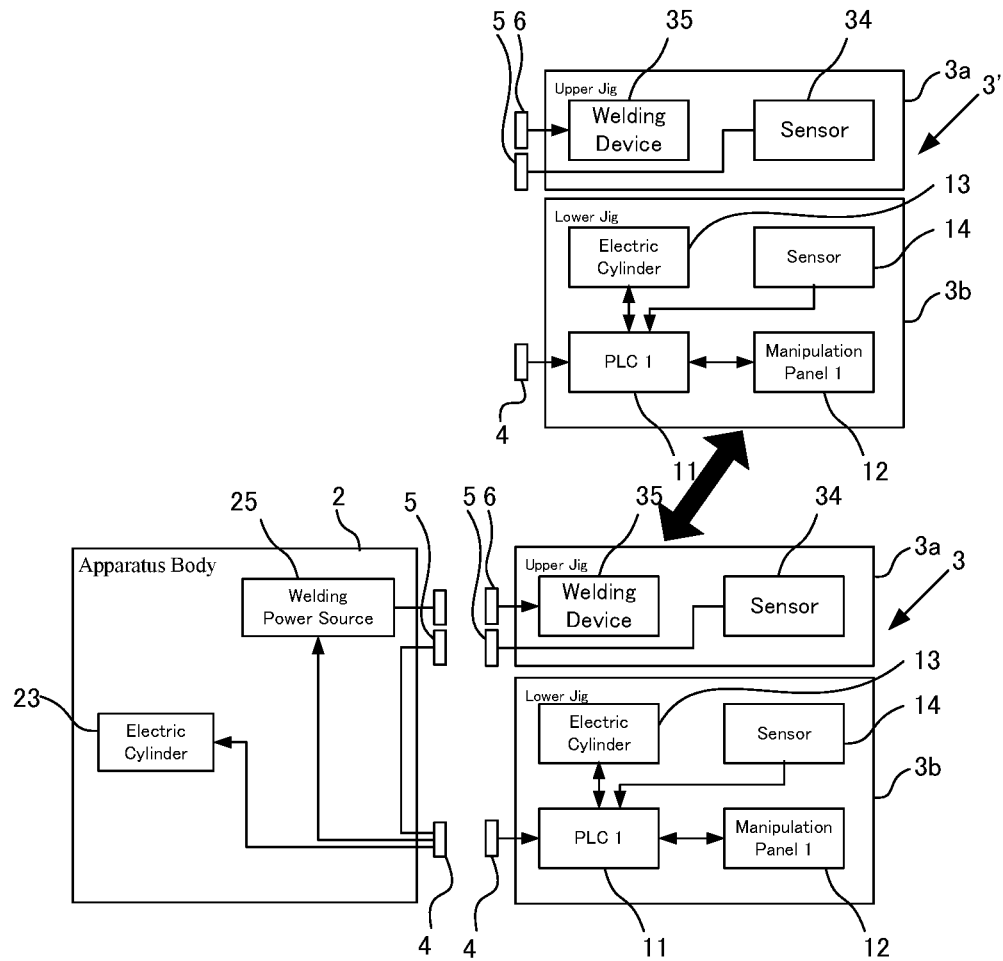
FIG. 3 is a diagram showing a schematic configuration where a jig unit of the processing apparatus of the present invention is exchanged.

FIG. 3 is a schematic explanatory view of a configuration where the jig unit 3 of the processing apparatus 1 of the present invention is exchanged with another jig unit 3'. Simultaneously with the exchange of the jig unit 3 with the jig unit 3', the apparatus body 2 and the jig unit 3' are connected with the communication connectors 4, 5 and the welding power source connector 6. Accordingly, the jig unit 3 can be easily exchanged with the jig unit 3'.

An operating program dedicated to a jig is already introduced in each master PLC 11 so that there is no possibility of an operating program for another model being operated. Accordingly, when the jig unit 3 is exchanged, processing can be started immediately after the jig unit 3 is exchanged. Therefore, the time before processing starts after performing changeover can be shortened. Different from the conventional processing apparatus, it is unnecessary to read and install an operating program and to perform an operation check of the operating program. For this reason, an error in setting a program can be eliminated and, at the same time, a setup loss can be reduced.

Figure 4:
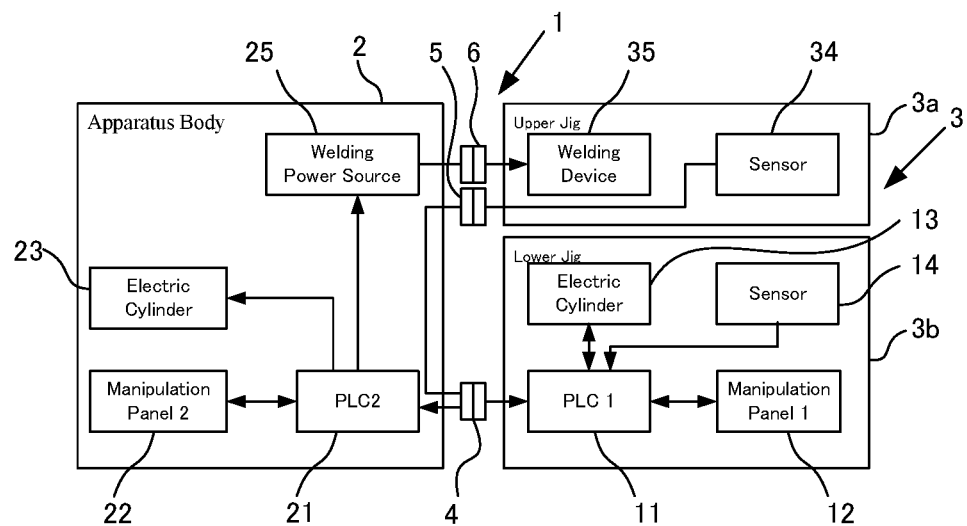
FIG. 4 is a diagram showing a schematic configuration of a processing apparatus according to further aspects of the invention.

FIG. 4 shows the configuration where a slave PLC 21 is mounted on the apparatus body 2, and an operating program in the master PLC 11 controls an operation of the processing apparatus body through the slave PLC 21. The slave PLC 21 functions as a communication device between the master PLC 11 and the apparatus body 2.

When the jig unit 3 is removed from the apparatus body 2, it may be also possible for the slave PLC 21 to manipulate the electric cylinder 23 in a single form.

EXAMPLE 1

A welding example where the welding device is mounted on the processing apparatus of the present invention is described with reference to FIG. 4, FIG. 5, and FIGS. 6A to 6D.

FIG. 4 shows a configuration where the slave PLC 21 is mounted on the apparatus body 2 of the processing apparatus 1 shown in FIG. 1 so as to function as a communication device with the master PLC 11. With the use of the abovementioned communications protocol, a communication control of the master PLC 11 and the slave PLC 21 can be performed only by connecting a standardized communication connector. Accordingly, minimal connection failure and erroneous operation conditions can be maintained.

The slave PLC 21 receives an operation command from the master PLC 11, and the slave PLC 21 operates with the same function as the master PLC 11 thus controlling the electric cylinder 23 and the welding power source 25 of the apparatus body 2.

In controlling the operations of the electric cylinder 23 and the welding power source 25, the manipulation panel 22 of the apparatus body 2 possesses higher manipulability than the manipulation panel 12 of the lower jig 3b. Accordingly, the operation may be controlled by manipulating the master PLC 11 using the manipulation panel 22. With such a configuration, in the same manner as the welding device having the conventional configuration shown in FIG. 2, the operation can be controlled by performing a manipulation on the apparatus body 2 so that work efficiency is enhanced.

Figure 5:
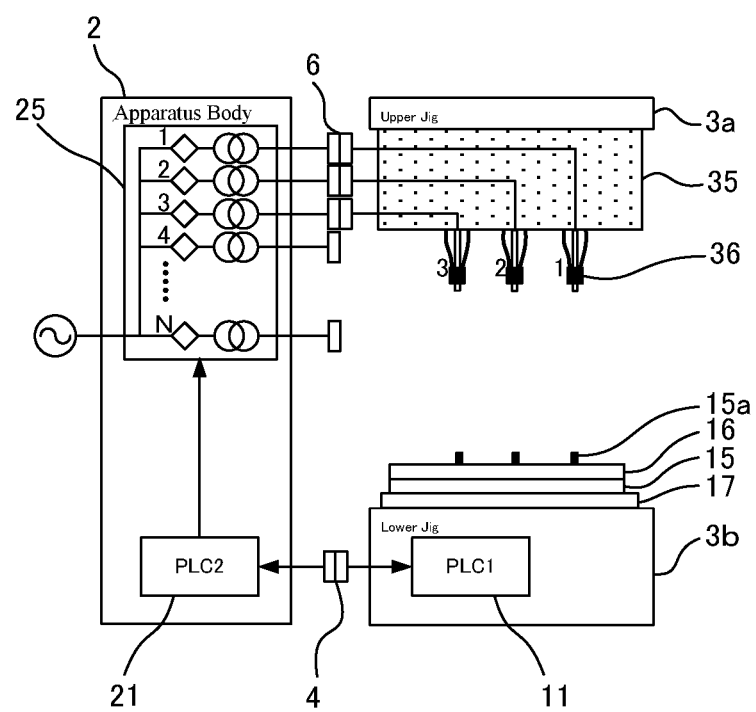
FIG. 5 is a schematic explanatory view of a welding circuit in welding processing of an example 1.

FIG. 5 is a schematic explanatory view of a welding circuit. An operation signal from the operating program in the master PLC 11 of the lower jig 3b is transmitted to the slave PLC 21 of the apparatus body 2 through the lower jig communication connector 4, and the slave PLC 21 controls the welding power source 25.

Corresponding to N number of welding points, N sets of members, each set being formed of a power regulator and a transformer, are mounted on the welding power source 25. In the explanatory view, an example is shown where welding is performed at three points by three welding tips mounted on the welding device 35. However, it is needless to say that a circuit configuration can be expanded or contracted by taking into account the number of welding points on a product to be processed and extensibility of the welding device.

The welding tips 36 mounted on the welding device 35 are welding tips for impulse heating. A welding voltage supplied from the welding power source 25 is applied to the welding tips 36 through the welding power source connectors 6 thus heating the welding tips 36.

Next, the manner of operation in a welding step is described from an attachment of the jig unit with reference to FIG. 6A to FIG. 6D.

The welding step is performed using a known thermal caulking method so that the detailed description of the thermal caulking is omitted.

Figure 6A:
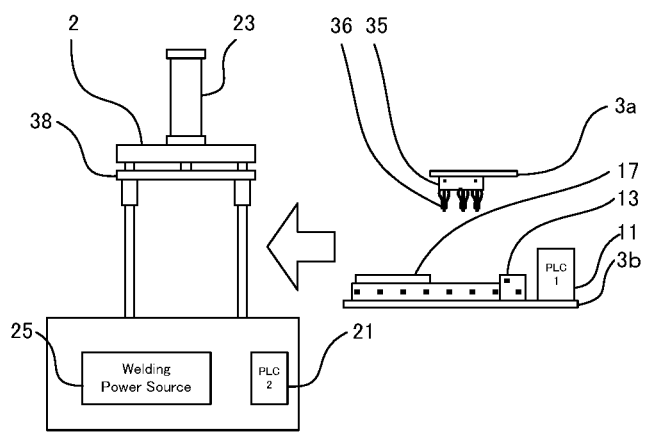
FIG. 6A to FIG. 6D are explanatory views of a welding step in the example 1.

FIG. 6A is an explanatory view of the apparatus body 2 and the jig unit 3. The welding device 35 is mounted on the upper jig 3a. A thermocouple (not shown in the drawing) is attached to each welding tip 36.

The master PLC 11, the master manipulation panel 12 (not shown in the drawing), the electric cylinder 13 and a receiving base 17 are mounted on the lower jig 3b. The receiving jig 17 is moved by the electric cylinder 13 in the lateral direction.

A lower portion of the apparatus body 2 is formed of the slave PLC 21 and the welding power source 25, and an upper portion of the apparatus body 2 is formed of an attachment plate 38 which is moved by the electric cylinder 23 in the vertical direction.

Figure 6C:
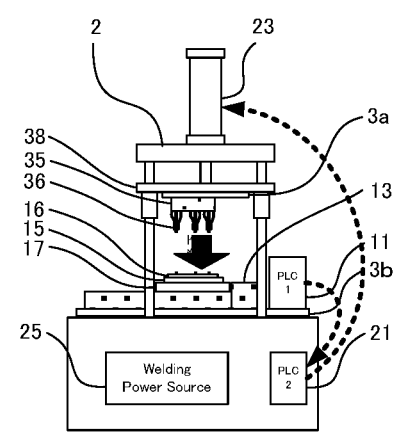
Figure 6B:
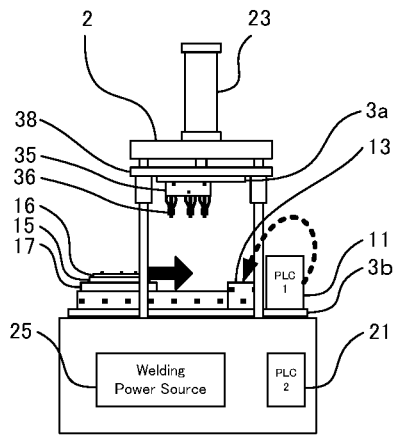

As shown in FIG. 6B, in a state where the jig unit 3 is attached to the apparatus body 2, the upper jig 3a is clamped by the attachment plate 38. On the receiving base 17 of the lower jig 3b clamped by the lower portion of the apparatus body 2, a welding workpiece 15 and an object to be fixed 16 are placed in an overlapping manner with a welding boss 15a interposed therebetween.

When a processing start button (not shown in the drawing) is pressed down, the electric cylinder 13 is operated by a command of the operating program in the master PLC 11 so as to move the welding workpiece 15 to a processing position in the processing apparatus 2.

After the welding workpiece 15 is moved to the predetermined processing position, as shown in FIG. 6C, the command of the master PLC 11 reaches the electric cylinder 23 through the slave PLC 21 so that the upper jig 3a starts to move downward.

Figure 6D:
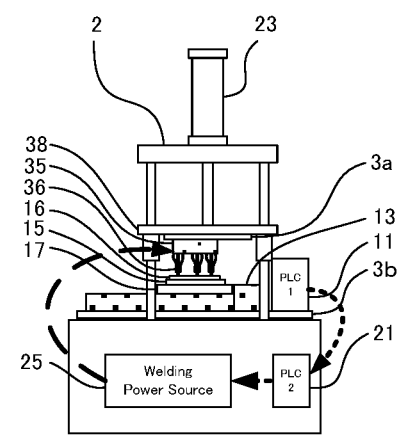

After the upper jig 3a moves downward to a predetermined position shown in FIG. 6D, the welding tips 36 come into contact with the welding boss 15a thus starting thermal welding.

The voltage applying command of the master PLC 11 reaches the welding power source 25 through the slave PLC 21. Then, a voltage of the welding power source 25 is applied to the welding tips 36 so that heat is generated at distal ends of the welding tips 36 whereby the welding boss 15a is welded (thermally caulked).

After the welding boss 15a is welded up to a predetermined height, a voltage is stopped. Then, the welding tips 36 and the welding boss 15a are cooled by air by an air cooling circuit not shown in the drawing.

After the welding tips 36 and the welding boss 15a are cooled down to a normal temperature, a supply of air is stopped, and the upper jig 3a moves upward to a predetermined position. Then, the welding workpiece 15 is moved to a start position. With such operations, the welding step is finished.

EXAMPLE 2

Figure 7A:
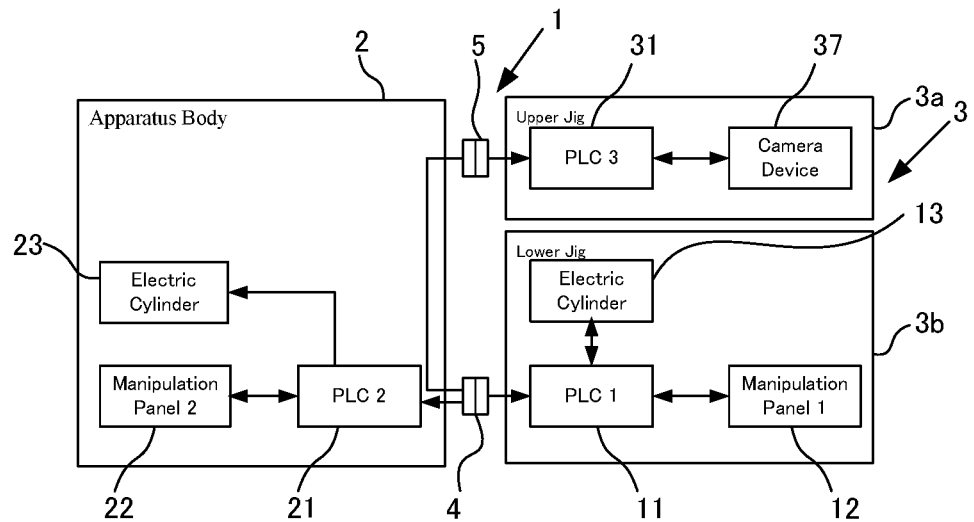
FIG. 7A is a schematic configuration diagram of an example 2.
Figure 7B:
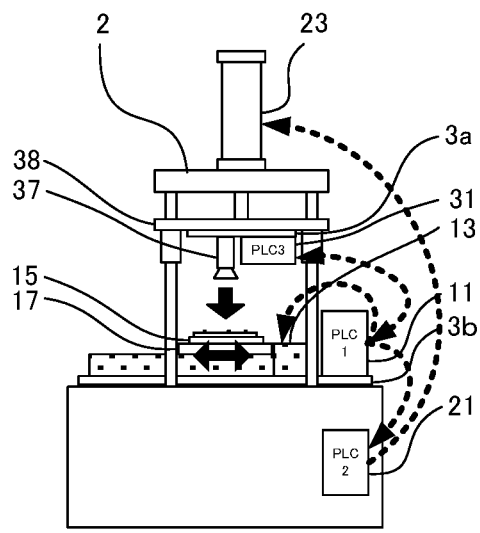
FIG. 7B is an operation explanatory view of the example 2.

With reference to FIG. 7A which is a schematic configuration diagram and FIG. 7B which is an operation explanatory view, as an example of further aspects according to the invention, a state is described where the processing apparatus is used as a camera inspection device for performing an appearance inspection of a product.

To perform a control of the apparatus, as shown in FIG. 7A, a second slave PLC 31 is mounted on an upper jig in addition to a master PLC 11 mounted on a lower jig 3b and a slave PLC 21 mounted on an apparatus body 2.

In the same manner as the example 1, the master PLC 11 controls all operations of the apparatus, and an electric cylinder and a manipulation panel of the apparatus body 2 are operated through the slave PLC 21.

An operation command to a camera device 37 mounted on an upper jig 3a and measurement result information from the camera device 37 are subjected to communication control with the master PLC 11 connected to the camera device 37 through the second slave PLC 31.

Next, an operation for performing an image inspection of a workpiece 15 using the camera device 37 is described with reference to FIG. 7B.

When an operating program for performing the image inspection in the master PLC 11 is activated, the movement and the positioning of the workpiece 15 placed on the receiving base 17 are performed by the electric cylinder 13. Then, the camera device on the upper jig 3a is moved downward to a set position by the electric cylinder 23 so as to adjust a focus.

Next, a command to perform the image inspection is transmitted to the camera device 37 from the master PLC 11 through the second slave PLC 31.

The camera device 37 photographs the workpiece 15, and a good/bad determination of the workpiece is performed by an internal image processing. The inspection result of the workpiece 15 is transmitted to the master PLC 11 through the second slave PLC 31.

After the appearance inspection is finished, the electric cylinder 13 and the electric cylinder 23 are commanded to return to initial positions by the master PLC 11, and the good/bad determination which is the inspection result is displayed on the manipulation panel 22. With such operations, the inspection is finished.

In this example, the second slave PLC 31 is used as a communication control I/F between the master PLC 11 and the camera device 37. However, the application of the second slave PLC 31 is not limited to the communication control I/F. The second slave PLC 31 may perform a control of any of various kinds of devices such as a positioning device, a measuring device and a robot in a single form or in cooperation with the master PLC 11.

APPENDIX

Reference Signs List 1 processing apparatus
2 apparatus body
3 jig unit
3a upper jig
3b lower jig
4 lower jig communication connector
5 upper jig communication connector
6 welding power source connector
11 master PLC
12 master manipulation panel
13 electric cylinder
14 lower jig sensor
15 welding workpiece
15a welding boss
16 object to be fixed
17 receiving base
21 slave PLC
22 slave manipulation panel
23 electric cylinder
25 welding power source
31 second slave PLC
35 welding device
36 welding tip
37 camera device
38 attachment plate
41 processing apparatus having conventional configuration
43 jig unit having conventional configuration

What is claimed is:
1. A processing apparatus comprising:
an apparatus body;
a jig unit exchangeable with respect to the apparatus body;
a master control device mounted on the jig unit; and
a slave control device mounted on the apparatus body, wherein the master control device and the slave control device include a communication device respectively, and an operation of the jig unit is controlled by an operating program in the master control device, and an operation of the apparatus body is controlled by the operating in the master control device with the slave control device through the communication device.

2. The processing apparatus according to claim 1, further comprising:
   another jig unit; and
   a second slave control device, including a communication device, mounted on the other jig unit, wherein the jig unit comprises an upper jig or a lower jig and the master control device is mounted on the jig unit as the upper jig or the lower jig and the other jig unit is the other of the upper jig and the lower jig on which the second slave control device is mounted, which is controlled by the operating program in the master control device through the second slave control device.

3. The processing apparatus according to claim 2, wherein the master control device, the slave control device, and the second slave control device are programmable logic controllers.

4. The processing apparatus according to claim 1, wherein the processing apparatus is a heat welding device, and the jig unit includes a heat welding unit where an operation of the heat welding unit is controlled by the master control device.

5. The processing apparatus according to claim 1, wherein in a state where the jig unit is removed from the processing apparatus, an operation of the apparatus body is controlled by the slave control device.

6. The processing apparatus according to claim 1, wherein:
   the master control device is mounted on one of an upper jig and a lower jig of the jig unit, and a second slave control device is mounted on another one of the upper jig and the lower jig of the jig unit;
   the second slave control device includes a communication device; and
   the jig unit on which the second slave control device is mounted is controlled by the operating program in the master control device with the second slave control device through the communication device.

7. The processing apparatus according to claim 6, wherein the master control device, the slave control device, and the second slave control device are programmable logic controllers.

8. The processing apparatus according to claim 7, wherein an operation of the apparatus body is controlled by the slave control device when the jig unit is removed from the processing apparatus.

9. The processing apparatus according to claim 6, wherein an operation of the apparatus body is controlled by the slave control device when the jig unit is removed from the processing apparatus.

10. The processing apparatus according to claim 1, wherein an operation of the apparatus body is controlled by the slave control device when the jig unit is removed from the processing apparatus.

11. A processing apparatus comprising:
    an apparatus body;
    a jig unit;
    a master control device is mounted on the jig unit, and operations of the jig unit and the apparatus body are controlled by an operating program in the master control device;
    a slave control device mounted on the apparatus body, wherein the master control device and the slave control device include a communication device respectively, and an operation control performed by the operating program in the master control device controls an operation of the apparatus body through the slave control device;
    another jig unit; and
    a second slave control device, including a communication device, mounted on the other jig unit, wherein the jig unit comprises an upper jig or a lower jig and the master control device is mounted on the jig unit as the upper jig or the lower jig and the other jig unit is the other of the upper jig and the lower jig on which the second slave control device is mounted, which is controlled by the operating program in the master control device through the second slave control device.

12. The processing apparatus according to claim 11, wherein the master control device, the slave control device, and the second slave control device are programmable logic controllers.

* * * * *